(12) United States Patent
Nishimura

(10) Patent No.: US 6,968,552 B2
(45) Date of Patent: Nov. 22, 2005

(54) PROCESSOR UNIT FOR EXECUTING EVENT PROCESS IN REAL TIME IN RESPONSE TO OCCURRENCE OF EVENT

(75) Inventor: Tadaharu Nishimura, Obu (JP)

(73) Assignee: DENSO Corporation, Kariya (JP)

( * ) Notice: Subject to any disclaimer, the term of this patent is extended or adjusted under 35 U.S.C. 154(b) by 650 days.

(21) Appl. No.: 10/020,437

(22) Filed: Dec. 18, 2001

(65) Prior Publication Data

US 2002/0078257 A1 Jun. 20, 2002

(30) Foreign Application Priority Data

Dec. 20, 2000 (JP) .............................. 2000-387120

(51) Int. Cl.⁷ ............................................... G06F 9/46
(52) U.S. Cl. .................................... 718/107; 718/103
(58) Field of Search ................................ 718/107, 102, 718/100, 108, 103; 719/318, 310; 701/102, 701/36, 48

(56) References Cited

U.S. PATENT DOCUMENTS

| 4,337,513 A | * | 6/1982 | Furuhashi ................... 701/114 |
| 4,482,962 A | * | 11/1984 | Amano et al. .............. 701/114 |
| 4,658,351 A | * | 4/1987 | Teng .......................... 718/103 |
| 4,768,149 A | | 8/1988 | Konopik et al. |

(Continued)

FOREIGN PATENT DOCUMENTS

| JP | 60-253397 | 12/1985 |
| JP | 3-78034 | 4/1991 |
| JP | 4-118704 | 4/1992 |

(Continued)

OTHER PUBLICATIONS

Silberschatz et al.; "Operating System Concepts—Fourth Edition"; Addison-Wesley, Boston, MA, USA; 1994; XP002328940; pp. 28-35.

Primary Examiner—Sue Lao
(74) Attorney, Agent, or Firm—Nixon & Vanderhye P.C.

(57) ABSTRACT

A processor unit is incorporated in a vehicle as an engine control unit (ECU). In the ECU, in response to occurrence of an event, an activation request program requests a real time operating system to activate a task that includes an event process corresponding to the event. The event processes corresponding to cyclic events, which occur in synchronous with the engine cycle or at regular intervals, are included in dedicated tasks each of which is created as one of the tasks for executing only one event process. Therefore the activation request program does not need to store the ID of the event process in a queue when it requests activation of a dedicated task. Further, when a dedicated task is activated by the RTOS, it can identify an event process to be executed without retrieving the ID of the event process from the queue.

10 Claims, 3 Drawing Sheets

U.S. PATENT DOCUMENTS

| | | | | |
|---|---|---|---|---|
| 4,954,948 A | * | 9/1990 | Hira et al. | 718/107 |
| 5,162,999 A | * | 11/1992 | Wild et al. | 701/114 |
| 5,349,656 A | * | 9/1994 | Kaneko et al. | 718/102 |
| 5,390,329 A | * | 2/1995 | Gaertner et al. | 718/108 |
| 5,448,735 A | * | 9/1995 | Anderson et al. | 718/100 |
| 5,490,064 A | * | 2/1996 | Minowa et al. | 701/1 |
| 5,606,703 A | | 2/1997 | Brady et al. | |
| 5,627,745 A | * | 5/1997 | Flood | 700/2 |
| 5,636,124 A | * | 6/1997 | Rischar et al. | 700/100 |
| 6,148,321 A | | 11/2000 | Hammond | |
| 6,236,910 B1 | * | 5/2001 | Iwai et al. | 701/1 |
| 6,240,358 B1 | * | 5/2001 | Kawai | 701/114 |
| 6,260,058 B1 | * | 7/2001 | Hoenninger et al. | 718/107 |
| 6,445,989 B2 | * | 9/2002 | Nishimura et al. | 701/48 |
| 6,754,576 B2 | * | 6/2004 | Nishimura | 701/102 |

FOREIGN PATENT DOCUMENTS

| | | |
|---|---|---|
| JP | A-6-139121 | 5/1994 |
| JP | A-10-105416 | 4/1998 |

* cited by examiner

PROCESSOR UNIT FOR EXECUTING EVENT PROCESS IN REAL TIME IN RESPONSE TO OCCURRENCE OF EVENT

CROSS REFERENCE TO RELATED APPLICATION

The present application relates to and incorporates herein by reference Japanese Patent Application No. 2000-387120 filed on Dec. 20, 2000.

BACKGROUND OF THE INVENTION

1. Field of the Invention

The present invention relates to a task switching technique involved in a real time operating system (RTOS).

2. Related Art

In an electronic control unit (ECU) installed on a vehicle, some processes included in its control program should be executed in real time for providing the sufficient responsiveness of control and a driver's safety. Accordingly, the control program is composed of tasks to each of which a priority level is assigned, and a RTOS performs switching among the tasks during execution of the control program so that processes of a higher priority are executed in real time.

Specifically, when occurrence of an event is detected, an activation request program requests activation of a task which includes a process (event process) corresponding to the event. The RTOS activates the task in response to the request, and the activated task executes the event process. A priority level is assigned to each of the tasks as described above based on the priority of execution. A process that is strongly required to be executed in real time is included in a higher priority task. When activation of a task, which is not active, is requested, the RTOS activates the task if the priority level of the task is higher than the priority level of an active task.

A task switching technique that creates tasks corresponding to the respective priority levels is proposed. In this case, all the event processes of the same priority level are included in the task corresponding to the priority level as follows.

Assuming that one of three priority levels is assigned to each of the tasks, a higher priority task A, a moderate priority task B, and a lower priority task C are created as shown in FIG. 5. A 1 ms process, a 30° CA (crank angle) process and the like are included in the task A. The 1 ms process is executed every 1 ms, and the 30° CA process is executed for every 30° rotation of the crankshaft.

A 4 ms process, an 8 ms process, a Tdc process, an engine stall process, a fault detection process and the like are included in the task B. The 4 ms process is executed every 4 ms, and the 8 ms process is executed every 8 ms. The Tdc process is executed whenever the piston of a specific cylinder reaches the top dead center (TDC). The engine stall process is executed when the engine of the vehicle stalls. The fault detection process is executed for detecting a fault for self-diagnosis. A 16 ms process, a 32 ms process and the like are included in the task C. The 16 ms process is executed every 16 ms, and the 32 ms process is executed every 32 ms.

This task switching technique thus creates the tasks corresponding to the respective priority levels, because the RTOS performs switching among the tasks based on the priority levels of the tasks. According to this technique, the number of the tasks equals the number of the priority levels, that is, it is not very large. Further the amount of management information which should be held by the RTOS is relatively small, and consequently the capacity of memory such as RAM required for storing the management information is also relatively low.

However, according to the technique, each of the tasks should select the event process to be executed from the event processes included therein.

Specifically, in response to occurrence of an event, the activation request program requests the RTOS to activate the task which includes the event process corresponding to the event and simultaneously stores identification (ID) information on the event process in a queue (storage area). When the RTOS activates the task, the activated task retrieves the ID of the event process to be executed from the queue and executes the event process corresponding to the retrieved ID.

A FIFO (first-in first-out) queue, which is a buffer from which the IDs are retrieved in the same order they were stored, is employed for storing the IDs of the event processes in consideration of the case that various events occur in quick succession.

According to the above technique, whenever an event occurs, the ID of the corresponding event process should be stored in the queue and retrieved from the queue, that is, a queuing operation should be executed. Further, it should be determined for queuing whether at least one ID is stored in the queue and whether the queue is full. Therefore the CPU load is heavy when the various events occur in quick succession.

When the CPU load is heavy, activation of a task of a lower priority is delayed, and consequently execution of the event process included in the lower priority task is delayed. When the CPU load reaches the limit of CPU capability, the event process included in the lower priority task is discarded, that is, it is not executed in the end. As a result, the responsiveness of control is lowered, and consequently the performance of the ECU is degraded.

SUMMARY OF THE INVENTION

It is an object of the present invention to reduce CPU load in a processor unit when the CPU executes processes in real time using a task switching technique.

A processor unit according to the present invention executes event processes in response to occurrence of a plurality of predetermined events. The processor unit includes a program which includes a plurality of tasks, an activation request program, and an RTOS. Each of the tasks includes at least one event process which is executed in response to occurrence of one of the plurality of predetermined events. At least one specific event is selected from the plurality of predetermined events, and a dedicated task for executing only one event process is prepared for an event process corresponding to the specific event.

In response to occurrence of an event, the activation request program requests activation of the task which includes the event process corresponding to the event. Further the activation request program stores the ID of the event process in a storage area if the task includes an event process other than the event process. The RTOS activates the task in response to the request. The activated task obtains the ID of the event process from the storage area and identifies the event process based on the obtained ID, if the task includes a plurality of event processes. If the activated task is a dedicated task, it can identify the event process without obtaining ID from the storage area. The activated task executes the identified event process.

Preferably, one of a plurality of priority levels is assigned to each of the plurality of tasks and each of the event processes. The same priority level is assigned to a task and event processes included therein. The RTOS activates a task in response to the request for activation of the task, if the priority level of the task is higher than the priority level of an active task. A cyclic event which occurs in a cycle is selected from the plurality of predetermined events as the specific event for which a dedicated task is prepared.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF THE PREFERRED EMBODIMENT

A processor unit according to an embodiment of the present invention is incorporated in a vehicle as an engine control unit (ECU). The ECU controls an internal combustion engine installed in the vehicle.

Figure 1:
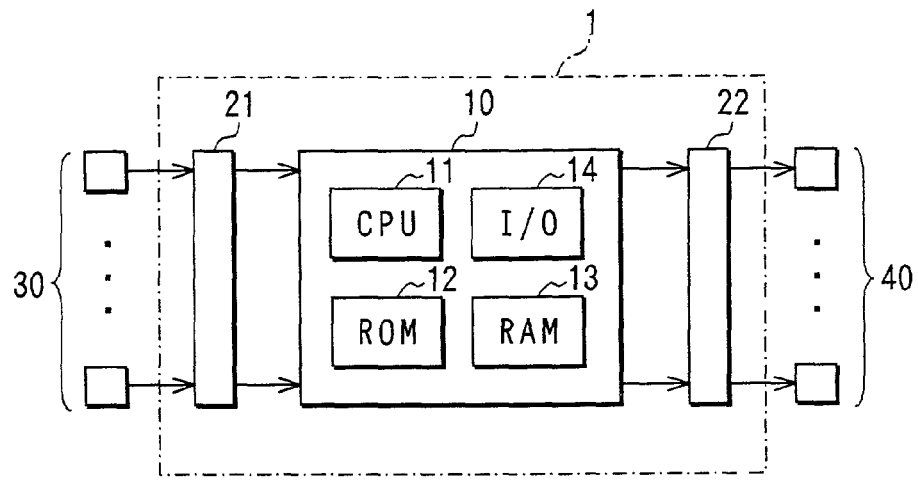
FIG. 1 is a block diagram showing a processor unit according to an embodiment of the present invention installed in a vehicle as an engine control unit.

Referring to FIG. 1, the ECU 1 includes a microcomputer 10, an input circuit 21 and an output circuit 22. The input circuit 21 receives analog signals from various sensors 30 that detect the operating state of the engine. The sensors 30 include a crank angle sensor, a reference point sensor, a coolant temperature sensor, an oxygen sensor and the like.

The crank angle sensor generates a pulse signal whenever the crankshaft further turns for a predetermined angle. The reference point sensor generates a pulse signal whenever the piston of a specific cylinder reaches a predetermined point (e.g., TDC). The coolant temperature sensor detects the temperature of coolant. The oxygen sensor measures the oxygen concentration in exhaust gas.

The input circuit 21 shapes the waveform of the received analog signals, and converts the shaped analog signals into digital signals. The resultant signals are outputted to the microcomputer 10.

The microcomputer 10 includes a CPU 11, ROM 12, RAM 13 and an I/O subsystem 14. The CPU 11 executes various programs based on the signals received from the input circuit 21 for controlling the engine. The ROM 12 stores the programs executed by the CPU 11. The RAM 13 stores the results of operations and the like during the execution of the programs.

The I/O subsystem 14 enables the microcomputer 10 to receive signals from the input circuit 21 and outputs signals to the output circuit 22. The microcomputer 10 further includes various registers, a free running counter and the like. The microcomputer 10 outputs control data as a result of the execution of the programs to the output circuit 22.

The output circuit 22 activates actuators 40 installed in the engine in response to the control data received from the microcomputer 10. The actuators 40 include that for an injector (fuel injection system), that for an igniter (ignition device) and the like. Thus the ECU 1 controls the engine based on the signals from the sensors 30.

Figure 2:
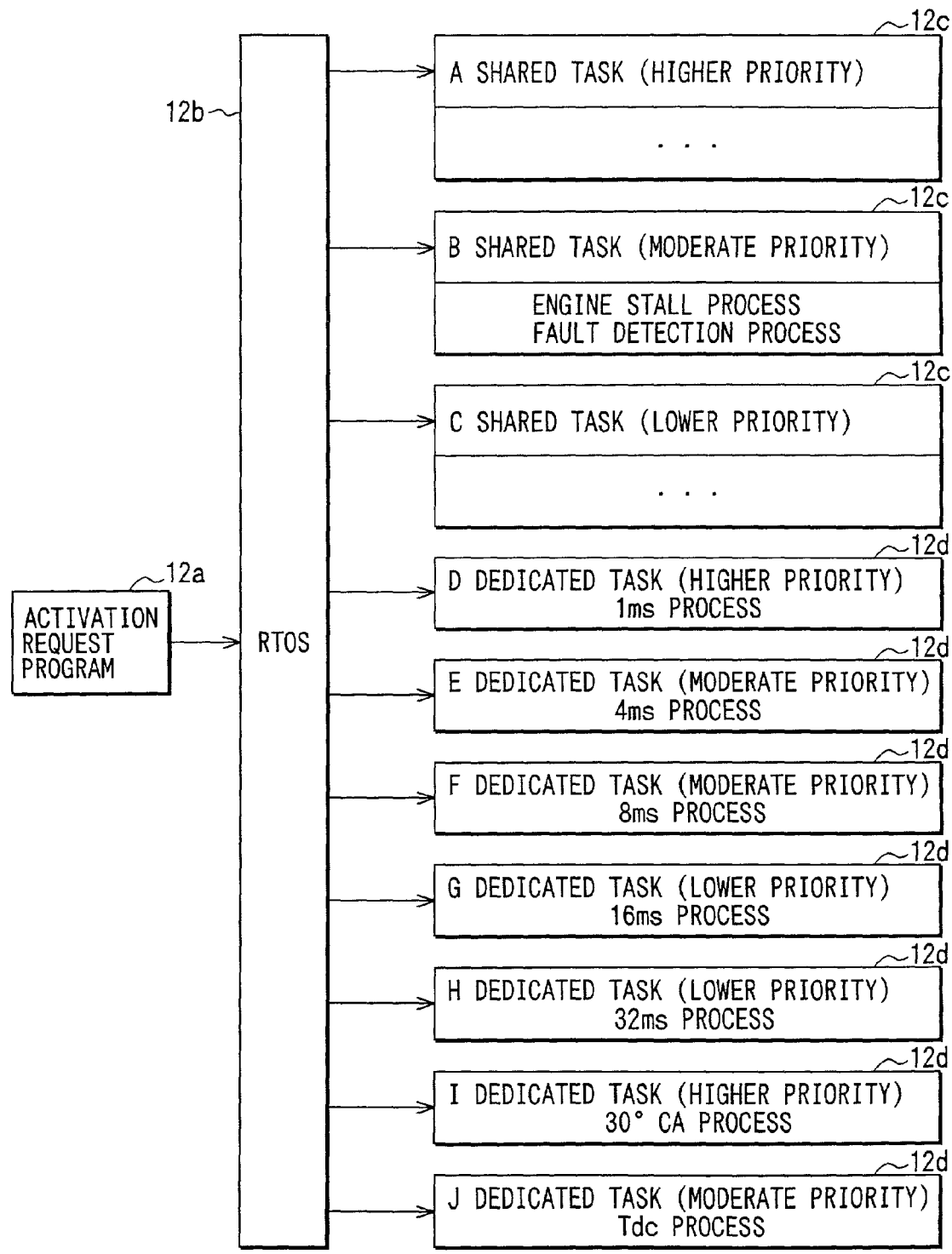
FIG. 2 is a block diagram showing an engine control program stored in ROM of the processor unit.

The programs stored in the ROM 12 include an engine control program that involves task scheduling and task switching. Referring to FIG. 2, the engine control program includes an activation request program 12a, an RTOS 12b, and tasks 12c, 12d. One of a plurality of priority levels is assigned to each of the tasks 12c, 12d.

The activation request program 12a detects occurrence of one of predetermined events, and executes an activation request process in response to the occurrence of the event. The occurrence of the event is detected based on, for example, the signals from the sensors 30. Further the occurrence of the event may be detected based on the value of the free running counter in the microcomputer 10, or based on information from an in-vehicle LAN or the like.

The activation request process selects the task 12c, 12d corresponding the detected event, and requests the RTOS 12b to activate the selected task 12c, 12d. The RTOS 12b activates the selected task 12c, 12d in response to the activation request, only when the priority level of the selected task 12c, 12d is higher than the priority level of an active task. Thus the RTOS 12b performs switching among the tasks 12c, 12d, so that the task 12c, 12d which is strongly required to be executed in real time is preferentially executed.

Figure 5:
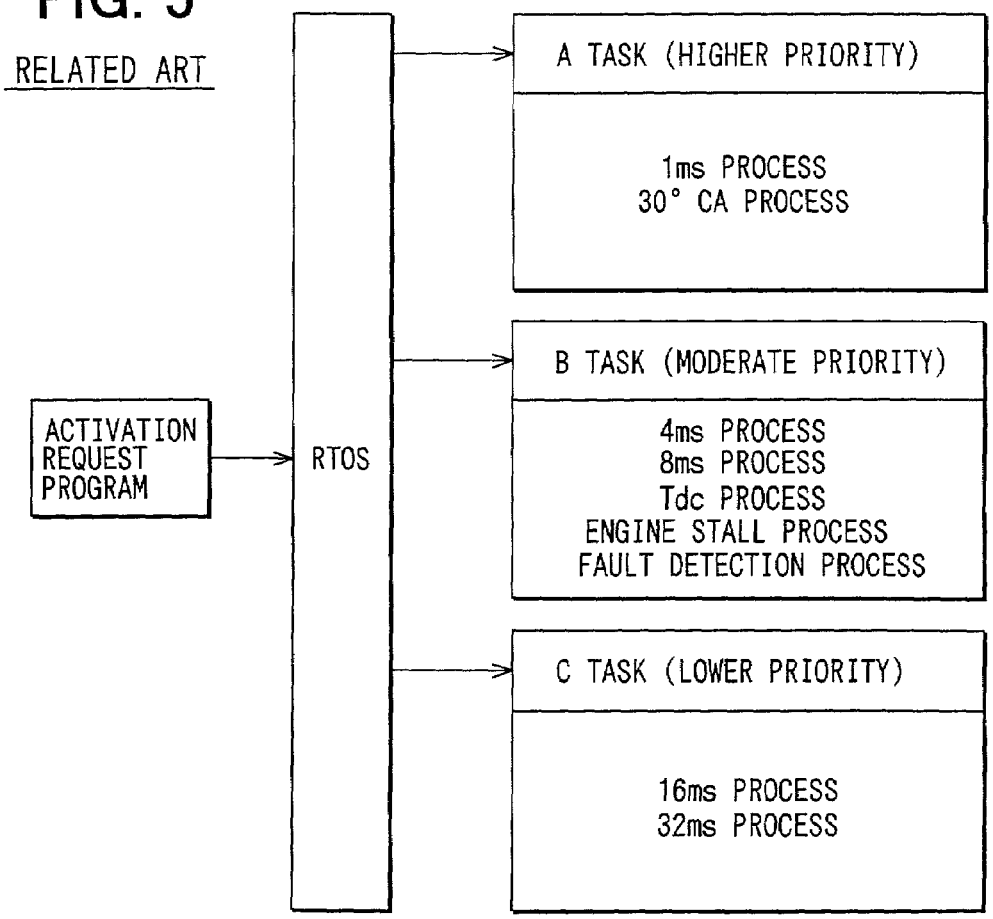
FIG. 5 is a block diagram showing a program involving task scheduling and task switching according to related art.

The tasks 12c, 12d includes three shared tasks 12c and seven dedicated tasks 12d. Each of the dedicated tasks 12d is prepared for executing only one event process corresponding to a specific event. An event which occurs in synchronous with the engine cycle or an event which occurs regularly at predetermined time intervals is selected as the specific event. In FIG. 2, the dedicated tasks D–J are provided for a 1 ms process, a 4 ms process, an 8 ms process, a 16 ms process, a 32 ms process, a 30° CA process, and a Tdc process, respectively. These processes are the same as the above-described processes of FIG. 5.

The shared tasks A–C are prepared for the respective priority level, that is, higher priority, moderate priority, and lower priority. Each of event processes corresponding to events other than the events selected as the specific processes is included in the shared task 12c whose priority level is the same as that of the event process. In FIG. 2, an engine stall process and a fault detection process of moderate priority level is included in the shared task B of moderate priority level.

When an event occurs, a trigger signal for triggering off execution of the event process corresponding to the event is generated. Further the message which includes event-related data which should be passed to the task 12c, 12d for execution of the corresponding event process is generated if necessary. In response to the trigger signal, the activation request process of the activation request program requests activation of the task which includes the event process corresponding to the event as follows, if the task is a shared task 12c.

Figure 3A:
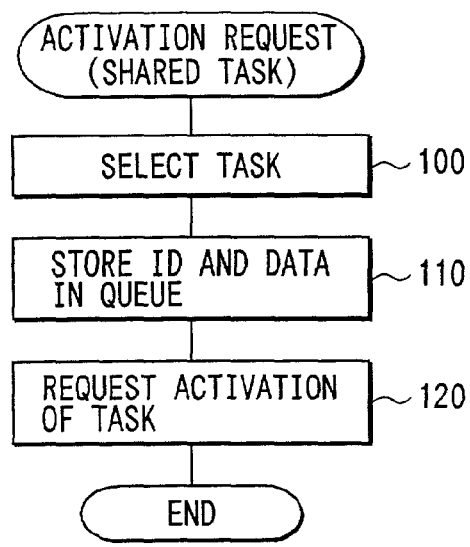
FIG. 3A is a flowchart of an activation request process executed for activation of a shared task.

Referring to FIG. 3A, the shared task 12c which includes the event process corresponding to the event is selected based on the ID of the event process at step 100. The ID of the event process is stored in a queue at step 110. Further the event-related data is also stored in the queue at step 110, if such data is required to be passed to the selected shared task 12c. At step 120, activation of the selected shared task 12c is requested. Then the activation request process terminates.

Figure 3B:
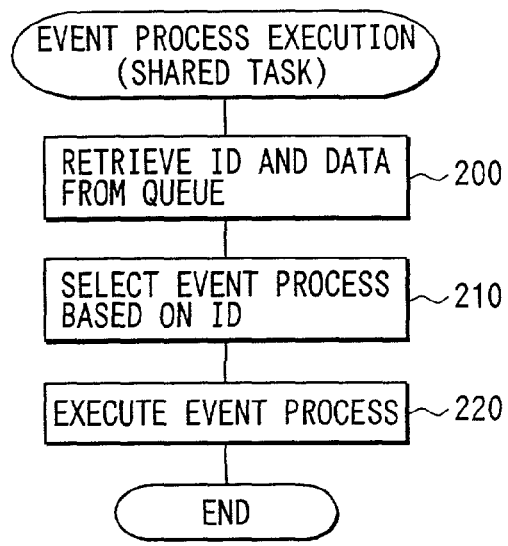
FIG. 3B is a flowchart of a process executed by a shared task for execution of an event process.

When the RTOS 12b activates the shared task 12c, the shared task 12c executes an event process as follows. Referring to FIG. 3B, the ID of the event process to be executed next is retrieved from the queue at step 200. If the event-related data corresponding to the event process is stored in the queue, the data is also retrieved from the queue at step 200. The event process to be executed next is selected based on the retrieved ID at step 210. The selected event process is executed at step 220. Then the shared task 12c terminates the process for execution of the event process.

Since each of the shared tasks 12c includes a plurality of event processes, queuing of the ID of the event process should be performed at steps 110, 220, and further the event process to be executed next should be selected based on the ID at step 210.

Figure 4A:
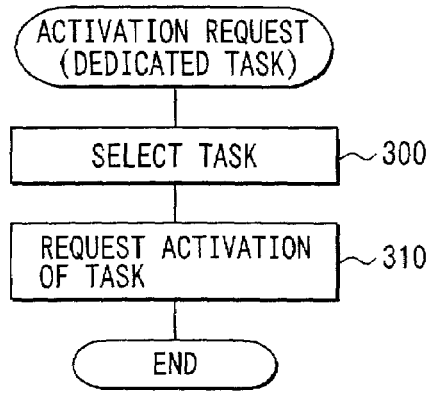
FIG. 4A is a flowchart of an activation request process executed for activation of a dedicated task.

In contrast, the activation request process of the activation request program requests activation of the task which includes the event process corresponding to the detected event as follows, if the task is a dedicated task 12d. Referring to FIG. 4A, the dedicated task 12d which includes the event process corresponding to the detected event is selected based on the ID of the event process at step 300 similarly to step 100 of FIG. 3A. At step 310, activation of the selected dedicated task 12d is requested. Then the activation request process terminates.

Figure 4B:
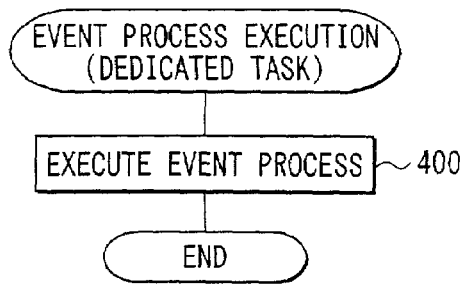
FIG. 4B is a flowchart of a process executed by a dedicated task for execution of an event process.

When the RTOS 12b activates the dedicated task 12d, the dedicated task 12d simply executes the event process included therein as shown FIG. 4B and then terminates the process for execution of the event process.

Since each of the dedicated tasks 12d includes only one event process, queuing of the ID of the event process or ID-based selection of the event process, which are executed at steps 110, 200, 210 in the case of the shared task 12c, is not required to be performed in the case of the dedicated task 12d.

The effects of the present embodiment are as follows. In order to perform queuing of the IDs of the event processes, whenever an event occurs, the ID of the event process should be stored and retrieved. Further it should be determined whether at least one ID is stored in the queue and whether the queue is full. If queuing operation need to be performed in response to the occurrence of a cyclic event which occurs in synchronous with the engine cycle or occurs at regular time intervals, the CPU load is very heavy.

However, according to the present embodiment, the dedicated tasks 12d are provided for the cyclic events. Accordingly, queuing operation does not need to be performed in response to a cyclic event, and therefore the CPU load is greatly reduced. The queuing operation needs to be performed in response to an occasional event such as an engine stall or a fault according to the present embodiment. However, this does not cause the heavy load on the CPU.

Further in the present embodiment, the shared tasks 12c corresponding to the respective priority levels are prepared for the event processes corresponding to the occasional events for which the dedicated tasks 12d are not provided. Thus the number of tasks is minimized so that task switching can be performed based on the priority levels. Therefore the amount of management information which should be held by the RTOS 12b is relatively small, and consequently the capacity of the RAM required for storing the management information is also relatively low.

(Modifications)

In the above embodiment, events other than the cyclic events may be selected as the specific events for which the dedicated tasks 12d are provided. For example, events corresponding to event processes, which are more immune to elimination as a part of modification of the engine control program, may be selected as the specific events. If the specific events are thus selected, the engine control program can be more readily modified if necessary.

Further, events in response to which a message that includes the event-related data is not generated may be selected as the specific events. In the case that a message is generated in response to an event, the event-related data included therein should be passed to the task 12c, 12d. That is, the queuing operation should be performed for passing the event-related data in this case, even if the dedicated task 12d is provided for the event process corresponding to the event.

That is, the CPU load is reduced very little if the dedicated tasks 12d are provided for events in response to which the event-related data needs to be passed to the task 12c, 12d. Therefore it is preferable that events in response to which the event-related data does not need to be passed to the task 12c, 12d are selected as the specific events.

In the above embodiment, the engine control program may be stored in computer readable medium such as FD, MO, CD-ROM, DVD, or a hard disk. In this case, the engine control program is loaded from the computer readable medium into the RAM 13, and then executed. Further the engine control program may be stored in computer readable medium such as ROM or backup RAM. In this case, the computer readable medium is incorporated in the ECU 1.

The processor unit according the present invention is used as a unit, in which an RTOS executes programs involving task scheduling and task switching, other than the ECU 1 which controls the engine of the vehicle.

The present invention is not limited to the above embodiment and modifications, but may be variously embodied within the scope of the invention.

What is claimed is:

1. A computer implemented method for executing an event process in real time on a computer in response to one of a plurality of events, the method comprising the steps of:

creating a plurality of tasks and assigning one of a plurality of priority levels to each of the tasks;

creating a plurality of event processes corresponding to the events and assigning one of the priority levels to each of the event processes;

dividing the event processes into the tasks so that each of the event processes is included in a task of a priority level same as a priority level of the event process;

requesting activation of a certain task which includes a certain event process corresponding to a certain event in response to occurrence of the certain event;

storing an ID of the certain event process in a queue in response to occurrence of the certain event when the certain task includes an event process other than the certain event process;

activating the certain task when a priority level of the certain task is higher than a priority level of an active task;

the certain task obtaining the ID of the certain event process from the queue and identifying the certain event process based on the obtained ID when the certain task is activated; and the certain task executing the certain event process identified, wherein at least one specific event is selected from the events, and specific event process corresponding to the specific event is included in a dedicated task, which is created at the creating a plurality of tasks step as one of the tasks for executing only one event process, wherein the dedicated task identifies the specific event process for execution without obtaining an ID of the specific event process from the queue when the dedicated task is activated.

2. A processor unit comprising:
a CPU; and
a task scheduling program that causes the CPU to detect an occurrence of an event and to execute an event process corresponding to the event whose occurrence is detected, the task scheduling program including:
  a plurality of tasks each of which causes the CPU to execute at least one associated event process,
  an activation request program that causes the CPU to detect the occurrence of the event and then to execute a request process that outputs a request for an activation of a first one of the plurality of tasks, and
  a real time operating system that causes the CPU to execute an activating process that activates the first one of the plurality of tasks based on one of a plurality of priority levels in response to the request for the activation;
wherein the plurality of tasks include:
  a dedicated task that causes the CPU to execute one specific event process corresponding to a specific event that includes a cyclic event which occurs in a cycle in synchronization with time, and
  a shared task that causes the CPU to execute at least one of a plurality of non-specific event processes corresponding to a plurality of non-specific events excluding the specific event,
wherein the activation request program stores, in a storage area, identification information by which the CPU identifies the one of the non-specific event processes based on the request for the activation of the one of the non-specific event processes,
the shared task includes an identification program that causes the CPU to execute an identification process that identifies the one of the non-specific event processes based on the identification information, and
the dedicated task does not include the identification program.

3. A processor unit of claim 2,
wherein the specific event does not require passing data from the activation request program to the dedicated task.

4. A processor unit of claim 2,
wherein the shared task is one of a plurality of shared tasks,
each of the shared tasks has been assigned a respective one of the plurality of priority levels, and
a certain non-specific event process is achieved in a shared task whose priority level is equal to a priority level of the certain non-specific event process.

5. A processor unit comprising:
a CPU; and
a task scheduling program that causes the CPU to detect an occurrence of an event and to execute an event process corresponding to the event whose occurrence is detected, for controlling a control object,
wherein the task scheduling program includes:
  a plurality of tasks each of which causes the CPU to execute at least one associated event process,
  an activation request program that causes the CPU to detect the occurrence of the event and then to execute a request process that outputs a request for an activation of a first one of the plurality of tasks, and
  a real time operating system that causes the CPU to execute an activating process that activates the first one of the plurality of tasks based on one of a plurality of priority levels in response to the request for the activation;
wherein the plurality of tasks include:
  a dedicated task that causes the CPU to execute one specific event process corresponding to a specific event that includes a cyclic event which occurs in a cycle in synchronization with an operating state of the control object, and
  a shared task that causes the CPU to execute at least one of a plurality of non-specific event processes corresponding to a plurality of non-specific events excluding the specific event,
wherein the activation request program stores, in a storage area, identification information by which the CPU identifies the one of the non-specific event processes based on the request for the activation of the one of the non-specific event processes,
the shared task includes an identification program that causes the CPU to execute an identification process that identifies the one of the non-specific event processes based on the identification information, and
the dedicated task does not include the identification program.

6. A processor unit of claim 5,
wherein the cyclic event occurs in synchronization with a cycle of an engine as the control object.

7. A processor unit of claim 5,
wherein the specific event does not require passing data from the activation request program to the dedicated task.

8. A processor unit of claim 5,
wherein the shared task is one of a plurality of shared tasks,
wherein each of the shared tasks has been assigned a respective one of the plurality of priority levels, and
wherein a certain non-specific event process is achieved in a shared task whose priority level is equal to a priority level of the certain non-specific event process.

9. A computer program product of a task scheduling program that causes a CPU to detect an occurrence of an event and to execute an event process corresponding to the event whose occurrence is detected, the computer program product comprising:
  a plurality of tasks each of which causes the CPU to execute at least one associated event process,
  an activation request program that causes the CPU to detect the occurrence of the event and then to execute a request process that outputs a request for an activation of a first one of the plurality of tasks, and
  a real time operating system that causes the CPU to execute an activating process that activates the first one of the plurality of tasks based on one of a plurality of priority levels in response to the request for the activation;
wherein the plurality of tasks include:
  a dedicated task that causes the CPU to execute one specific event process corresponding to a specific event that includes a cyclic event which occurs in a cycle in synchronization with time, and a shared task that causes the CPU to execute at least one of a plurality of non-specific event processes corresponding to a plurality of non-specific events excluding the specific event, wherein the activation request program stores, in a storage area, identification information by which the CPU identifies the one of the non-specific event processes based on the request for the activation of the one of the non-specific event processes, the shared task includes an identification program that causes the CPU to execute an identification process that identifies the one of the non-specific event processes based on the identification information, and the dedicated task does not include the identification program.

10. A computer implemented method comprising:

providing a plurality of tasks including (i) a shared task including a plurality of non-specific event processes corresponding to respective non-specific events, and (ii) a dedicated task including a single specific event process corresponding to a specific event which occurs regularly at predetermined time intervals;

assigning one of a plurality of priority levels to each of said plurality of tasks;

detecting an occurrence of a certain event; and storing an ID of one of the non-specific event processes in a queue which corresponds to the non-specific event only when the detected certain event is the non-specific event wherein an ID of the single specific event process is not stored in the queue when the detected certain event is the specific event.

* * * * *